C. B. AND D. STECHER.
AGRICULTURAL TRACTOR.
APPLICATION FILED FEB 4, 1921.

1,431,192.

Patented Oct. 10, 1922.

Inventor
Clarence B. Stecher
David Stecher
Their Attorneys

Patented Oct. 10, 1922.

1,431,192

UNITED STATES PATENT OFFICE.

CLARENCE B. STECHER AND DAVID STECHER, OF TRURO TOWNSHIP, FRANKLIN COUNTY, OHIO.

AGRICULTURAL TRACTOR.

Application filed February 4, 1921. Serial No. 442,441.

*To all whom it may concern:*

Be it known that we, CLARENCE B. STECHER and DAVID STECHER, citizens of the United States, residing at Truro Township, in the county of Franklin and State of Ohio, have invented a certain new and useful Improvement in Agricultural Tractors, of which the following is a specification.

This invention relates to motor driven tractors, especially such as are used for drawing plows, cultivators and other farm tools, an example of which is exhibited in the Moline Universal-Tractor-Model D, manufactured and sold by the Moline Plow Company, Moline, Illinois. In the use of such tractors for the purpose stated considerable trouble and expense has been occasioned when the plow or other tool meets an obstruction, such, for example, as a hidden stone or root, this event often causing much injury to the apparatus because the drawing power is not cut off or the clutch released with sufficient promptness to avoid disaster. The object of the present invention therefore, is principally to provide an apparatus having the usual means for controlling it with added devices whereby when the progress of the plow or other tool is arrested by such an obstruction the power is instantly and automatically cut off thereby avoiding the consequences referred to.

The invention is embodied in the example herein shown and described the features of novelty being finally claimed.

In the accompanying drawing forming part hereof—

Figure 1:
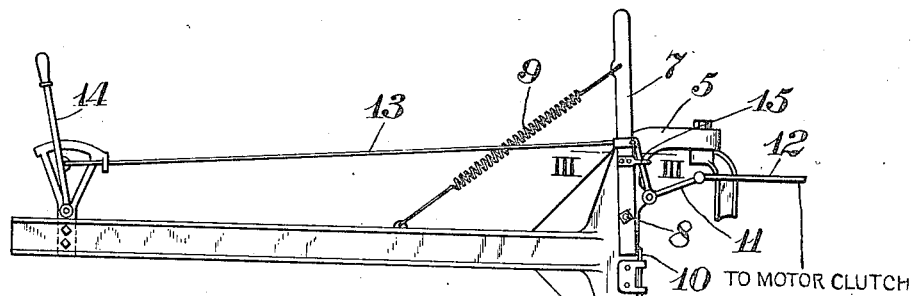
Figure 1 is a side view of as much of such apparatus as is necessary to illustrate the invention.
Figure 2:
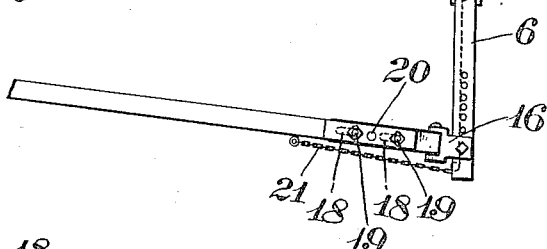
Fig. 2 is a combined plan and sectional view illustrating the connection of the plow beam with the draw bar.

In the views 5 designates the steering yoke and 6 the draw bar of a tractor of the sort referred to. To carry out our invention, the steering yoke is equipped with an upstanding lever 7 pivoted at 8. Connecting the upper portion of the lever and the yoke is a coil spring 9 adapted to draw the lever rearward with ample force for the purpose of operating the clutch lever of the motor to release the clutch as hereinafter explained. But to resist the tendency of the spring 9 the yoke is provided with a sliding pin 10, having its upper end standing normally in front of the lower end of the lever. In ordinary operation the clutch of the motor is operated through a bell crank lever 11 mounted in the yoke—one arm of which has connected to it a rod 12 extending forward and connected with the clutch member and the other arm of which has rod 13 extending rearward and provided with an operating hand lever 14 pivoted on the beam of the yoke.

Figure 3:
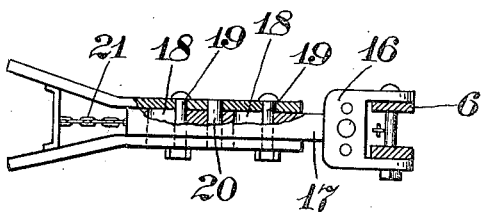
Fig. 3 is a combined plan and sectional view of the automatically controlled lever for actuating the motor clutch, the sectional portion being on the line III—III Fig. 1.

Normally in such a tractor the clutch is engaged and is released by drawing the hand lever 14 rearward. In order to provide for the operation of the lever 14 to release and engage the clutch without action on the lever 7 the latter lever is provided with a hook 15 within which the rear arm of the bell crank lever can just play without actuating said lever. When the clutch is engaged the said arm of the bell crank lever is in the position substantially as shown in Fig. 3, hence when the lever 7 is released and actuated by the spring 9 the hook 15 draws the bell crank lever in the direction necessary to release the clutch.

The plow beam is connected with the draw bar by means of a clevis 16 having a swinging shank 17, said shank being provided with one or more longitudinal slots 18 through which and the beam are passed suitable bolts 19. Also connecting the beam and said shank is a resistance member or pin 20 which may be of stout wood. The holes in the beam and said shank are so positioned with reference to the parts in which they are that when alined the bolts 19 stand at the forward ends of the slots, hence when extraordinary draft is exerted on the plow beam, as when the plow meets an insurmountable or impenetrable obstruction, the strain on the pin 20 is sufficient to cut it and permit movement of the shank with reference to the beam. Any other yielding resistance device can be used in the stead of the wooden pin. Connecting the trigger-like pin 10 and the beam is a chain 21 that when the beam is released by the breaking or cutting of the pin 20 as last described draws down said trigger from in front of the lower end of the lever and permits the actuation of the lever 7 by the spring 9 and the release of the clutch. We have found that the arrangement of the pin 10 and the other parts can be made so sensitive to operation that the slutch can be released before the pin 20 is completely severed.

The forms and arrangement of the parts can be changed without departing from the gist of the invention as claimed.

What we claim is:

1. In a tractor of the kind described, the combination of a tool beam, a clutch releasing means, means for operating the clutch releasing means at will and means for automatically actuating the clutch releasing means to release the clutch comprising the following instrumentalities, towit: a breakable pin and stop connecting the tool beam with the tractor, a tension member connected with the clutch releasing means, a trigger for holding said tension member in a state of tension, and means operated by the tool beam when subjected to abnormal strain to actuate said trigger to release the tension member.

2. The combination in a tractor of the kind described having a tool beam and clutch mechanism and means for releasing the clutch at will, of means for automatically releasing the clutch comprising a tensioned lever having an elongated hook adapted to act on the aforesaid clutch releasing means to release the clutch, a trigger for normally holding the lever under tension, and means actuated by the tool beam when subjected to abnormal strain to actuate said trigger to release the tensioned lever and the clutch.

CLARENCE B. STECHER.
DAVID STECHER.